June 15, 1926.  1,588,715
J. FAVATA, JR
OIL STOP STATION METER
Filed April 19, 1923   2 Sheets-Sheet 1
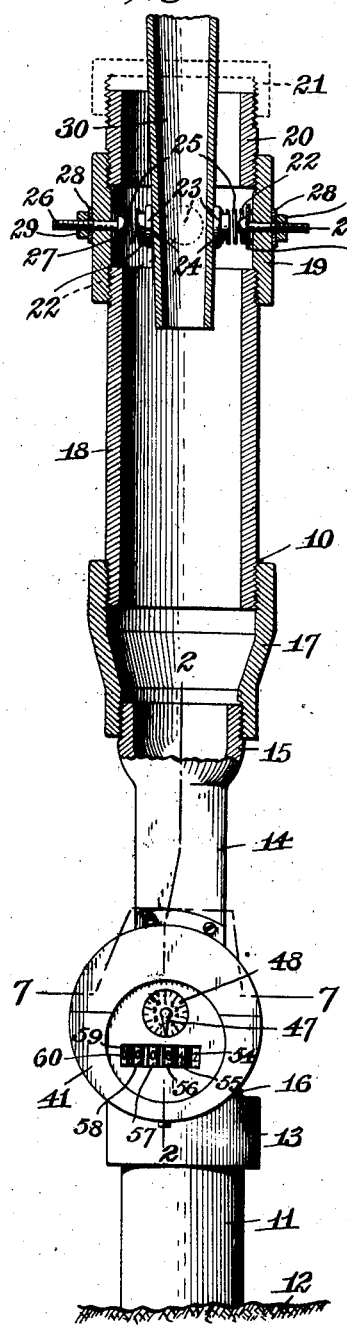
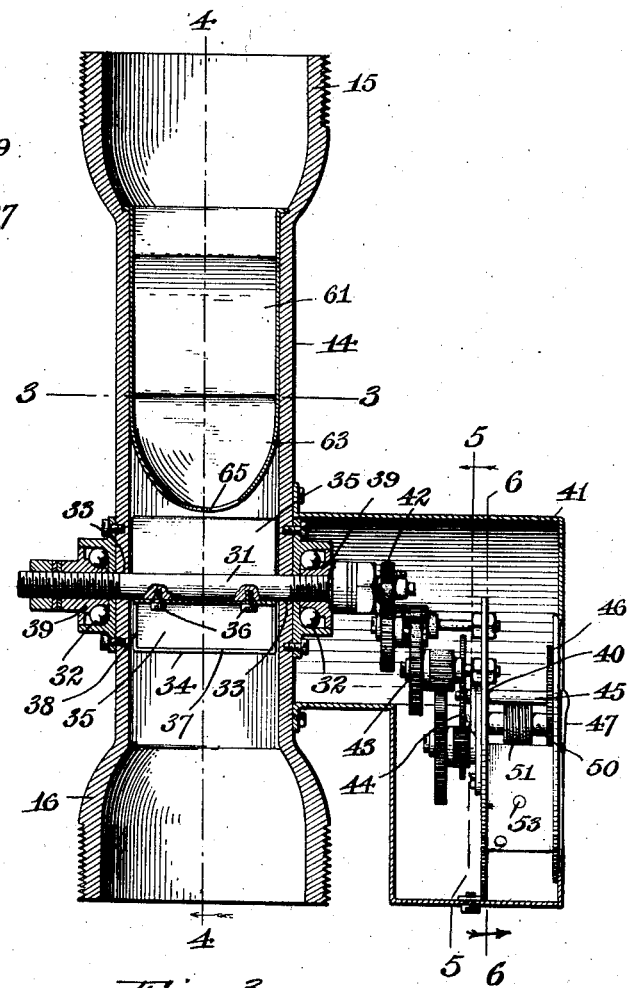
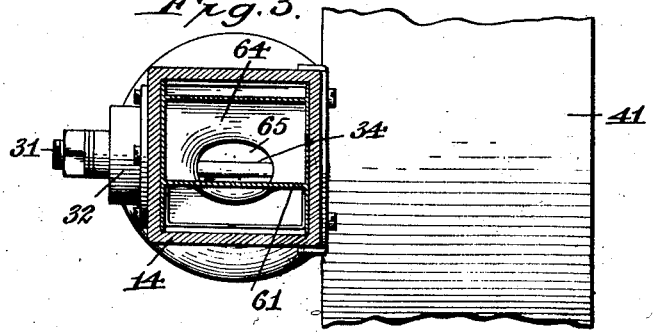
Witness:
J. J. Oberst,
Joseph Favata, Jr, Inventor
By Emil Neuhart
Attorney.

June 15, 1926.
J. FAVATA, JR
1,588,715
OIL STOP STATION METER
Filed April 19, 1923.   2 Sheets-Sheet 2
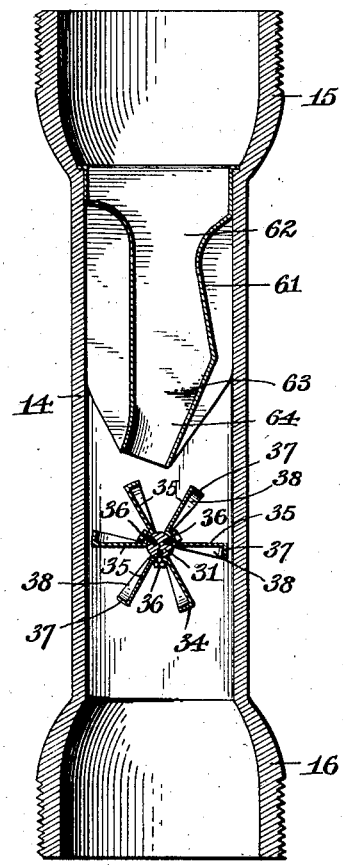
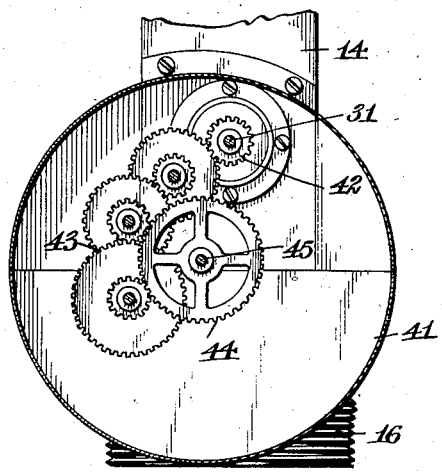
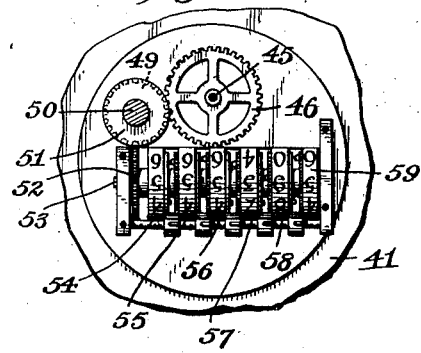
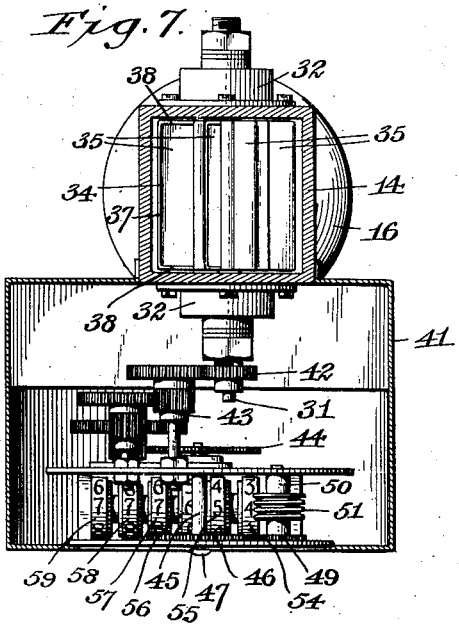
Joseph Favata, Jr., Inventor.
By *Emil Kenhart*
Attorney.
Witness:
J. J. Oberst.

Patented June 15, 1926.

1,588,715

UNITED STATES PATENT OFFICE.

JOSEPH FAVATA, JR., OF BUFFALO, NEW YORK.

OIL-STOP STATION METER.

Application filed April 19, 1923. Serial No. 633,325.

My invention relates to an oil stop station meter.

The present method of delivering gasoline to filling stations where tanks are provided, is to fill five or ten gallon cans from a portable tank and carry them to the stationary tanks in or at the filling station, and in this manner keep a record of the number of gallons delivered to the filling station. This method is both laborious and tedious, and when delivering a large number of gallons to the tank of a filling station, exact measurement of the number of gallons delivered is almost an impossibility, the delivery being either short or overmeasure, as the slight variation in each can will result in quite a shortage or overmeasure when delivering several hundred gallons of gasoline.

The primary object of my invention is to provide a metering device at the receiving tank, which will enable a hose to be connected thereto or inserted thereinto, and gasoline be thus delivered from the portable tank, usually a vehicle tank, to the stationary tank at the filling station in properly measured quantities.

A further object of my invention is to provide a device of this kind in which the passage of the liquid through an inlet conduit on the receiving tank will register accurately in quantity all gasoline passed therethrough and will indicate any fractional gallon or other unit of measure delivered when the receiving tank is filled, such fractional gallon or other unit of course to be paid for; thus all possibility of shortage in delivery or overmeasure not accounted for, is eliminated.

A still further object is to provide a receiving tank with a liquid concentrating nozzle or passage and a paddle wheel or turbine with which said concentrating nozzle or passage is so associated that all of the gasoline or other liquid passing through said nozzle or passage will act against said wheel and rotate the same, all of the gasoline or other liquid flowing from said concentrating nozzle or passage being effectively directed against said wheel so that accurate measurement will be registered on a registering device connected with said wheel.

With the above and other objects in view, the invention consists in the novel features of construction and in the arrangement and combination of parts to be hereinafter described and more particularly pointed out in the subjoined claims.

In the drawings:—

Fig. 1 is a sectional elevation of an inlet conduit adapted for connection with a liquid-receiving tank, such as usually buried under ground at a gasoline filling station.

Fig. 2 is an enlarged vertical section through the liquid concentrating and wheel containing portion of the inlet conduit, with connected parts removed, the section being taken on line 2—2, Fig. 1.

Fig. 3 is a transverse section taken on line 3—3, Fig. 2.

Fig. 4 is a vertical section taken on line 4—4, Fig. 2, looking in the direction of the arrow crossing said line.

Fig. 5 is a vertical section taken on line 5—5, Fig. 2, looking in the direction of the arrow crossing said line.

Fig. 6 is a transverse section taken on line 6—6, Fig. 2, looking in the direction of the arrow crossing said line, the enclosing casing being omitted.

Fig. 7 is an enlarged transverse section taken on line 7—7, Fig. 1.

The reference numeral 10 designates the inlet conduit, which extends upwardly from an underground liquid-receiving tank and which is formed of a plurality of parts, each of which will be hereinafter separately named and lettered. One part or pipe section of said inlet conduit, designated by the numeral 11, extends upwardly from the tank a short distance above the ground indicated at 12, Fig. 1, this being the usual pipe now provided on gasoline tanks. The upper end of this pipe is threaded and has a socket 13 thereon.

Threaded into this socket is what I term a liquid concentrating and wheel-retaining tube 14, which is preferably rectangular in cross section between its ends and has enlarged threaded upper and lower ends 15, 16, respectively, the threaded lower end 16 being entered in the socket 13, while threaded onto the upper end 15 thereof is a socket 17. This socket is preferably reduced downwardly, as clearly shown in Fig. 1, its enlarged upper end receiving a pipe section 18 threaded for the purpose and having also screw threads at its upper end onto which a nozzle-retaining socket 19 is threaded. Into the upper end of said nozzle-retaining socket a nipple 20 is threaded and said nipple, when gasoline or other liquid is not being delivered into the inlet conduit, is closed by a cap 21, as shown by dotted lines in Fig. 1.

The nozzle-retaining socket 19 has four nozzle-retaining devices 22 arranged therein, and in the construction shown, which is considered to be thoroughly practicable for the purpose intended, each retaining device comprises a head 23 in the form of a button having a shank 24 around which one end of a coil spring 25 is fitted to retain said head at the inner end of said spring. The spring is fastened to a screw 26 passed through an opening in said nozzle-retaining socket from the inner side thereof, the head of said screw bearing against a washer 27 held between two convolutions of said spring. The threaded end of said screw extends out through the wall of said socket and has a washer 28 applied thereto and bearing against the exterior of said socket, and a nut 29 threaded thereon and bearing against said washer.

More or less resiliency can be given each of the spring retainer devices, which may be referred to as yielding nozzle-retainer devices, by rotating the washer 27 within the spring and positioning the same between two convolutions closer to or farther from the head 22. These yielding nozzle-retainer devices are arranged at quarters around the socket, and when having a nozzle, as shown at 30, thrust therebetween, will retain said nozzle centrally within the upper end of the conduit, the nozzle shown being for example at the outer end of a hose connected to a portable tank, or to what is usually referred to as a wagon or truck tank, from which gasoline or other liquid is to be drawn.

It is of course desirable to have the nozzle slightly tapered, as shown, so that the outer or free smaller end thereof will pass between the retaining devices when they are fully extended by their springs, and when said nozzle is thrust between them, the springs of said devices will be somewhat compressed and the heads 22 thereof will bear yieldingly against said nozzle and retain the latter so that all that is required is to open a valve on the nozzle or the hose of the supply tank and allow the gasoline or liquid to pass into the conduit to be measured in a manner, to be presently described.

Arranged transversely through the tube 14 is a shaft 31, which is journaled in roller bearings 32 applied to the outer side of said tube at opposite points thereof, said shaft extending through openings 33 in the tube and having a turbine or paddle wheel comprising a plurality of paddles or wings 35 arranged in pairs and connected at their inner ends, the inner connected end of each pair of paddle wheels being secured to the shaft by means of the cap screws 36, or the like.

Each paddle or wing has at its outer edge a flange 37 and similar flanges 38 at opposite sides. They are therefore dish or scoop-like in formation and have the flanges of all paddles or wings extending in the same direction.

The ball bearings are provided with adjustable cones 39, and by adjusting these, the shaft may be mounted to rotate freely while preventing lengthwise movement thereof. In this manner the paddle wheel can be adjusted to prevent the ends thereof from riding in contact with opposite walls of the tube 14, and thus assure a sensitive action for said wheel.

Associated with the paddle wheel is a registering device 40 arranged within an enclosure or casing 41 fastened in any approved manner to the tube 14 and into which one end of the shaft 31 extends.

On the end of the paddle wheel shaft 31 which extends into said enclosure or casing 41, a pinion 42 is secured which is in mesh with one of the gear wheels of a gear train 43, another gear wheel or pinion of said gear train being in mesh with a gear wheel 44 secured to a shaft 45 forming part of the registering mechanism. Shaft 45 extends out through the register casing and has a gear wheel 46 thereon inside of said casing and an indicating finger or pointer 47 secured to its outer projecting end. Said indicating finger or pointer is adapted to travel circularly in front of a visible graduated dial 48 and the complete cycle of said finger or pointer represents actuation of said paddle wheel by exactly one gallon of gasoline or other liquid passing a given point of the space in which the paddle wheel 34 revolves. Said shaft may therefore be termed a unit shaft and any fraction of a gallon passing the paddle wheel 34 will be disclosed by the indicating finger or pointer and the graduation mark at which said finger or pointer stops.

The gear wheel 46 is in mesh with a pinion 49 on a shaft 50 parallel with the shaft 45. The shaft 50 has a worm 51 thereon, which meshes with a worm wheel 52 rotatable on a spindle 53 on which are rotatably mounted registering wheels 54, 55, 56, 57, 58, and 59, representing units, tens, hundreds, thousands, tens of thousands and hundreds of thousands, respectively.

The train of gears is such that when a gallon of liquid passes through the tube 14, the paddle wheel will revolve a sufficient number of times to cause the unit shaft 45 to make one complete revolution. For this reason I have referred to the graduated dial 48 as a unit-indicating dial. The gearing between the gear wheel 44 and the worm wheel 52 is such that ten complete revolutions of the shaft 45 are necessary to cause the worm wheel 52 to make a complete revolution, and as this worm wheel is integral with or fastened to the unit registering wheel 54, a new number is disclosed through the slot 60 in the register casing during each one-tenth of a revolution of said worm wheel. When said unit registering wheel 54 makes one complete revolution, the tens registering wheel 55 will make one-tenth of a complete revolution, owing to mechanism interposed between the same and said unit registering wheel, and expose a new number through the slot 60; this arrangement being carried out from the unit wheel to the wheel representing hundreds of thousands, as is common in registers of this type.

I do not lay any claim to the particular type of register or indicator used, only in so far as such a register or indicator provides for indicating each fraction of a gallon and recording each gallon passing over the paddle wheel. Therefore, any type of register or indicator serving to disclose the exact measurement to a fraction of a gallon or other unit of measurement, may be used in connection with my invention.

Within the tube which I term a concentrating tube for the reason that the liquid passing through the conduit is therein caused to flow through a reduced passage, peculiarly formed to direct a jet of liquid against the paddle wheel, is a combined concentrator and director tube 61, which in the specific construction shown is constructed separately from the tube 14 and inserted therein, but if desired, could be cast integral therewith.

The tube 61 has its passage abruptly restricted at 62 in one direction, but said passage maintains its full width in the opposite direction from the top thereof to a point near its lower end, indicated approximately at 63. It is, however, gradually enlarged downwardly from the region of its abrupt restriction and in the same direction as restricted, and thence restricted gradually from its point of greatest enlargement to the lower or outlet end of the tube. Along the lower portion of said tube the passage trends obliquely, as at 64, to direct the liquid against the paddles at one side of the center of the paddle wheel and said passage is narrowed from all sides to centralize the same and to form a substantially oval outlet 65; or, if desired, this outlet may be made circular, so long as the liquid is confined or concentrated within a narrower space, as it escapes from the concentrator or director.

By gradually enlarging the tube downwardly in one direction from the region of its abrupt restriction at 62, the gasoline flowing through the tube or passage thus provided is given slight impetus in its travel, and from this point of enlargement is concentrated by reason of its passing through the gradually narrowing lower end of the tube or passage, and as this gradually narrowing lower portion trends obliquely, the liquid under its full head or velocity is brought into action against the paddle wheel without any portion thereof passing over the wheel in inactive form.

In the specification and claims the term "concentrator" is employed in the sense that it serves to bring all of the liquid passing a certain point closer to the center of the tube, or to confine the flowing liquid within a smaller compass.

I wish to state that while the use of the nozzle retaining socket 19 is highly desirable, due to the fact that many concerns employ a hose with a nozzle on a wagon or truck tank, it may nevertheless be dispensed with where a hose is provided with a coupling adapted to be threaded onto the inlet conduit; and where dispensed with, the coupling may be threaded onto the tube or pipe 18, which may be shorter than that shown in the drawings or, if desired, the nipple 20 may be substituted for the tube or pipe 18, in which case the coupling would be threaded onto the conduit at a lower point than shown in the drawings. However, the construction disclosed permits the use of a coupling or nozzle for delivering gasoline or other liquid into the inlet conduit. When a coupling is employed, the cap 21 shown in dotted lines in Fig. 1 is removed and the coupling of the hose threaded directly onto the nipple 20. The diameter at the outer end of this nipple may be changed to conform to that of the coupling to be applied thereto, as these couplings vary with different concerns delivering gas to filling stations.

Having thus described my invention, what I claim is:—

1. A device of the kind described, comprising a conduit, a paddle within said conduit, registering mechanism connected with said paddle wheel, and a tube within said conduit directly above said paddle wheel through which liquid to be metered is passed, said tube being abruptly restricted laterally in one direction near its upper end and being obliquely disposed and centralized at its lower end to direct the liquid in jet form against said paddle wheel at one side of its center.

2. A device of the kind described, comprising a conduit, a paddle wheel within said conduit, registering mechanism connected with said paddle wheel, and a tube fitted into said conduit directly above said paddle wheel through which liquid to be metered is passed, said tube having its passage abruptly restricted near its upper end in one direction and continuing its full width in the other direction to a point near its lower end, the lower portion of said tube being directed at an angle to the vertical and restricted from all sides to form a substantially circular restricted outlet therefor, whereby the liquid is directed in jet form against said paddle wheel at one side of its center.

3. A device of the kind described, comprising a conduit, a paddle wheel within said conduit, and registering mechanism connected with said paddle wheel, said conduit having its passage above said paddle wheel restricted laterally in one direction a distance from said paddle wheel and being centralized and reduced in area at a lower point and directly above said paddle wheel.

4. A device of the kind described, comprising a conduit, a paddle wheel within said conduit, and registering mechanism connected with said paddle wheel, said conduit having its passage abruptly restricted laterally in one direction a distance from said paddle wheel while retaining its full dimension in the opposite direction and along a lower portion being gradually restricted downwardly from all directions and centralized to direct the liquid flowing therethrough against said paddle wheel at one side of its center.

5. A device of the kind described, comprising a conduit, a paddle wheel within said conduit, and registering mechanism connected with said paddle wheel, said conduit having its passage abruptly restricted in one direction a distance from said paddle wheel and from said point of abrupt restriction being gradually enlarged in the same direction and thence gradually restricted from all directions and reduced to its smallest area directly above said paddle wheel.

In testimony whereof I affix my signature.

JOSEPH FAVATA, Jr.